(12) United States Patent
Wróbel

(10) Patent No.: US 7,394,466 B2
(45) Date of Patent: Jul. 1, 2008

(54) METHOD FOR MEMORY ALLOCATION FOR IMAGES

(75) Inventor: Pawel Wróbel, Katowice (PL)

(73) Assignees: Advanced Digital Broadcast Polska SP. Z.O.O., Zielona Góra (PL); Advanced Digital Broadcast, Ltd., Taipei (TW)

( * ) Notice: Subject to any disclaimer, the term of this patent is extended or adjusted under 35 U.S.C. 154(b) by 558 days.

(21) Appl. No.: 10/518,650

(22) PCT Filed: Jun. 17, 2003

(86) PCT No.: PCT/PL03/00057

§ 371 (c)(1),
(2), (4) Date: Dec. 18, 2004

(87) PCT Pub. No.: WO04/001668

PCT Pub. Date: Dec. 31, 2003

(65) Prior Publication Data

US 2005/0231518 A1   Oct. 20, 2005

(30) Foreign Application Priority Data

Jun. 20, 2002   (PL) .................................... 354638

(51) Int. Cl.
*G06F 12/02* (2006.01)
*G06F 12/00* (2006.01)

(52) U.S. Cl. .................. 345/543; 711/171; 711/172

(58) Field of Classification Search ................. 345/543; 707/205; 711/170–172
See application file for complete search history.

(56) References Cited

U.S. PATENT DOCUMENTS

| 4,942,541 A | | 7/1990 | Hoel et al. |
| 5,784,699 A | * | 7/1998 | McMahon et al. .......... 711/171 |
| 5,903,280 A | | 5/1999 | Horiguchi |
| 5,926,227 A | * | 7/1999 | Schoner et al. ............. 348/512 |
| 6,049,330 A | | 4/2000 | Redford |
| 6,075,545 A | | 6/2000 | De Bonet et al. |

* cited by examiner

*Primary Examiner*—Kee M. Tung
*Assistant Examiner*—Hau H Nguyen
(74) *Attorney, Agent, or Firm*—Matthias Scholl P.C.

(57) ABSTRACT

In a method for memory allocation for images, when storing data describing an image (10) in operating memory (1), the image (10) is divided into lines, and each line is described by a separate subset of data from which at least one set of data is created, to which a free segment of operating memory (1) is assigned. The creation of sets of data is performed until data describing the whole image (10) is assigned to the sets of data, and when reading the image (10), consecutive lines are read from the operating memory (1), until the whole image (10) is read.

5 Claims, 6 Drawing Sheets

METHOD FOR MEMORY ALLOCATION FOR IMAGES

CROSS-REFERENCE TO RELATED APPLICATIONS

This is a National Stage Application of International Patent Application No. PCT/PL 03/00057, with an international filing date of Jun. 17, 2003, which is based on Polish Patent Application No. P-354638, filed Jun. 20, 2002.

BACKGROUND OF THE INVENTION

1. Field of the Invention

The present invention relates to a method for allocation of data for images in operating memory.

2. Brief Description of the Background of the Invention Including Prior Art

Images displayed on a screen are generated by a device, which outputs data in a form acceptable by a given display. Computer graphic cards or signal processors in digital TV set-top boxes are examples of such systems.

An image generated on a screen can be composed of various elements. It is the task of the graphic system to combine those elements and generate a resulting signal on the screen. These elements may include a text, an image or a video signal. The graphic processor reads the individual elements from a memory and combines them. To make it possible, the elements have to be stored in the memory in a suitable format. For an image, it is usually a set of bytes representing individual points of the image (pixels)—as well as additional information, such as the size of the image. It is a standard procedure to store the image in its entirety, in a single segment of memory, which assures speed and reliability of the image display process. Such an approach is unfortunately inefficient for systems with limited amount of operating memory.

SUMMARY OF THE INVENTION

1. Purposes of the Invention

It is an object of this invention to provide a method for allocation of data for images in operating memory that allows storing an image more efficiently.

This and other objects and advantages of the present invention will become evident from the description which follows.

2. Brief Description of the Invention

In a method for memory allocation for images, when storing data describing an image in operating memory, the image is divided into lines, and each line is described by a separate subset of data, from which at least one set of data is created, to which a free segment of an operating memory is assigned. The creation of sets of data is performed until data describing the whole image is assigned to the sets of data, and when reading the image, consecutive lines are read from the operating memory, until the whole image is read.

The sets of data can be created from the subsets of data describing the consecutive lines of the image to which no segment of operating memory has been assigned yet, and each created set of subsets of data is not larger than the free segment of memory in which the created set of data will be stored.

The created set of data can comprise data describing the whole image, and from this set of data at least one fragment is selected that is not larger than the free segment of memory, in which the selected fragment of the set of data will be stored.

The fragment selected from the set of data describing the whole image can be not smaller than the subset of data describing one line and not larger than a sum of subsets of data describing all the lines into which the image has been divided.

The selection of the fragment can be performed by dividing the set of data, comprising the subsets of data describing the lines to which no segment of operating memory has been assigned yet.

The selection of the fragment can be performed by decreasing the number of subsets of data describing the lines, to which no segment of operating memory has been assigned yet, by a predetermined number.

The predetermined number can be proportional to the number of subsets of data describing the lines, to which no segment of operating memory has been assigned yet.

Each line can be assigned a number.

Simultaneously with assigning the segments of operating memory to each line, the table of pointers to individual lines can be filled.

The table of pointers to individual lines can comprise the memory address of each line of the image.

The novel features which are considered as characteristic for the invention are set forth in the appended claims. The invention itself, however, both as to its construction and its method of operation, together with additional objects and advantages thereof will be best understood from the following description of specific embodiments when read in connection with the accompanying drawings.

BRIEF DESCRIPTION OF DRAWINGS

The object of this invention is shown in implementation examples in the enclosed drawings, in which.

DESCRIPTION OF THE INVENTION AND PREFERRED EMBODIMENT

Figure 1:
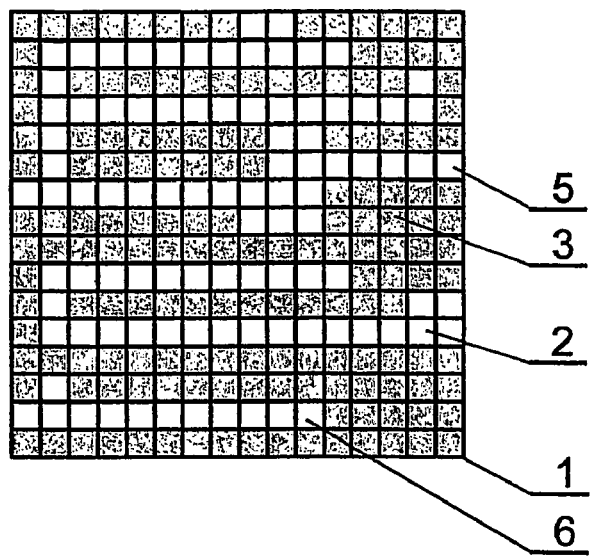
FIG. 1 shows a schematic of the operating memory.

In FIG. 1, the operating memory 1 consists of a set of segments that are free segments 2, 5 and 6, or occupied segments 3. When an image is to be stored in the operating memory 1, a free segment, in which the whole image can be stored, is searched for.

Figure 2:
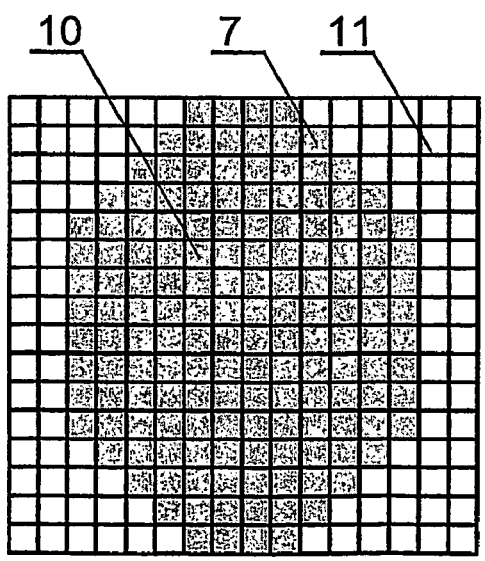
FIG. 2 shows an image divided into pixels.

FIG. 2 shows an image 10 as a grid of pixels, obtained by dividing the image 10 into 256 elements (16×16). Each of these elements contains a single pixel of the image 10. The elements of the image are shown as dark 7 and light 11 squares. Data describing the image 10 can be stored in the operating memory 1 only when one of the free segments 2, 5 or 6 is large enough to accommodate it. If there is no segment large enough, storing the image data is impossible. If the image 10 would be divided into individual elements, shown as squares, it could be stored in such fragmented memory, but the process of indexing individual elements would require a complex algorithm and therefore a relatively high computing power.

Figure 3:
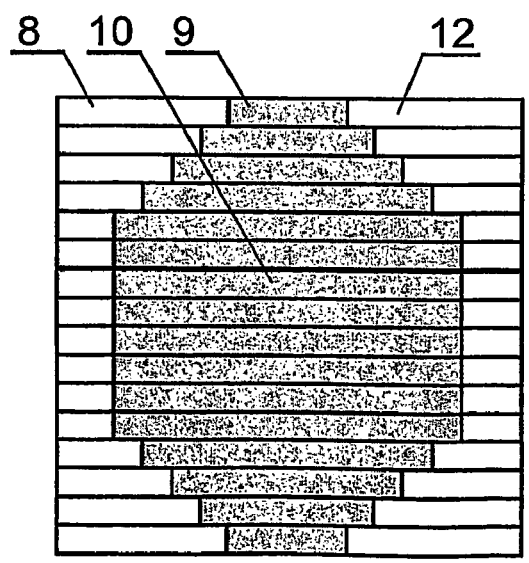
FIG. 3 shows an image divided into lines.

FIG. 3 shows the image 10 from FIG. 2, which has been divided into sixteen lines of sixteen pixels each. The top line shows a fragment of the image 10 composed of light areas, shown as light rectangles 8, 12, and a dark area, shown as a dark rectangle 9. By changing the method of division of the image 10 from pixels, as shown in FIG. 2, to lines, as shown in FIG. 3, the number of image fragments is reduced. Such a method still allows for storing data describing the image fragments in memory segments smaller than the segment required for storing the whole image. Each line is described by a separate subset of data. From these subsets, a set of data is created, which can describe a single image line or even the whole image.

While storing the data describing the image 10 in the operating memory, a table of pointers is created. The pointers define the location of individual image lines in the operating memory. The table of pointers is then used by every function, which performs operations on the image. The functions for storing and reading the image from the operating memory are described below.

In the algorithm for storing data, it is first checked if there exists a memory segment in which data describing the whole image could be stored. If not, the image is divided Into smaller and smaller fragments comprising a certain number of subsets describing individual lines. It is also checked if there exists a memory segment large enough to store in it the currently processed image fragment. To limit the number of fragments into which the image will be divided, the algorithm searches for memory segments of maximum size.

In the algorithm for reading the image from the memory, the image displaying function displays the image line by line. In order to display each line, the function reads the line from the memory segment specified in the table of pointers to individual lines.

Figure 4A:
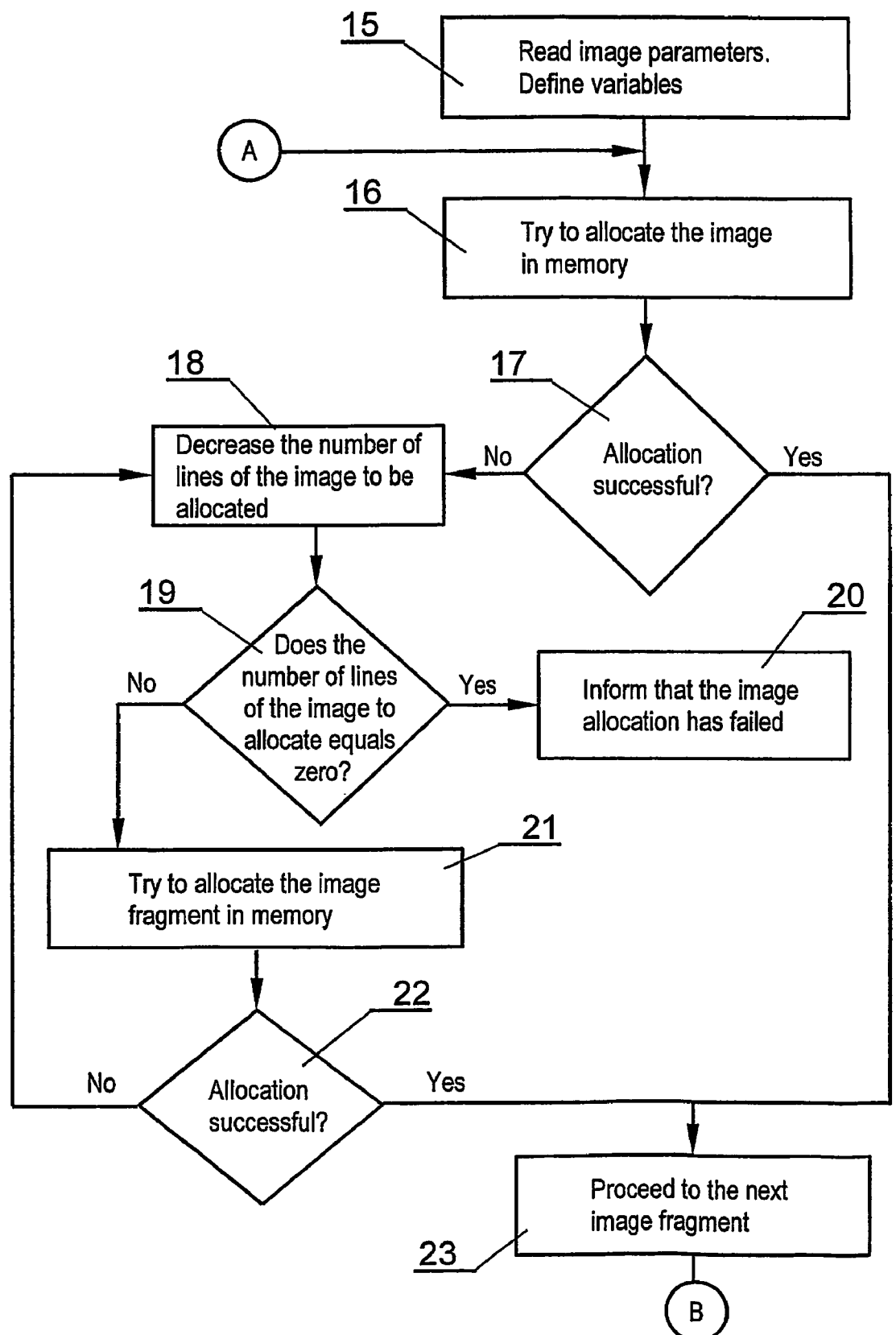
FIGS. 4A and 4B illustrate flow diagrams of an algorithm for storing, images divided into lines, in the memory.
Figure 4B:
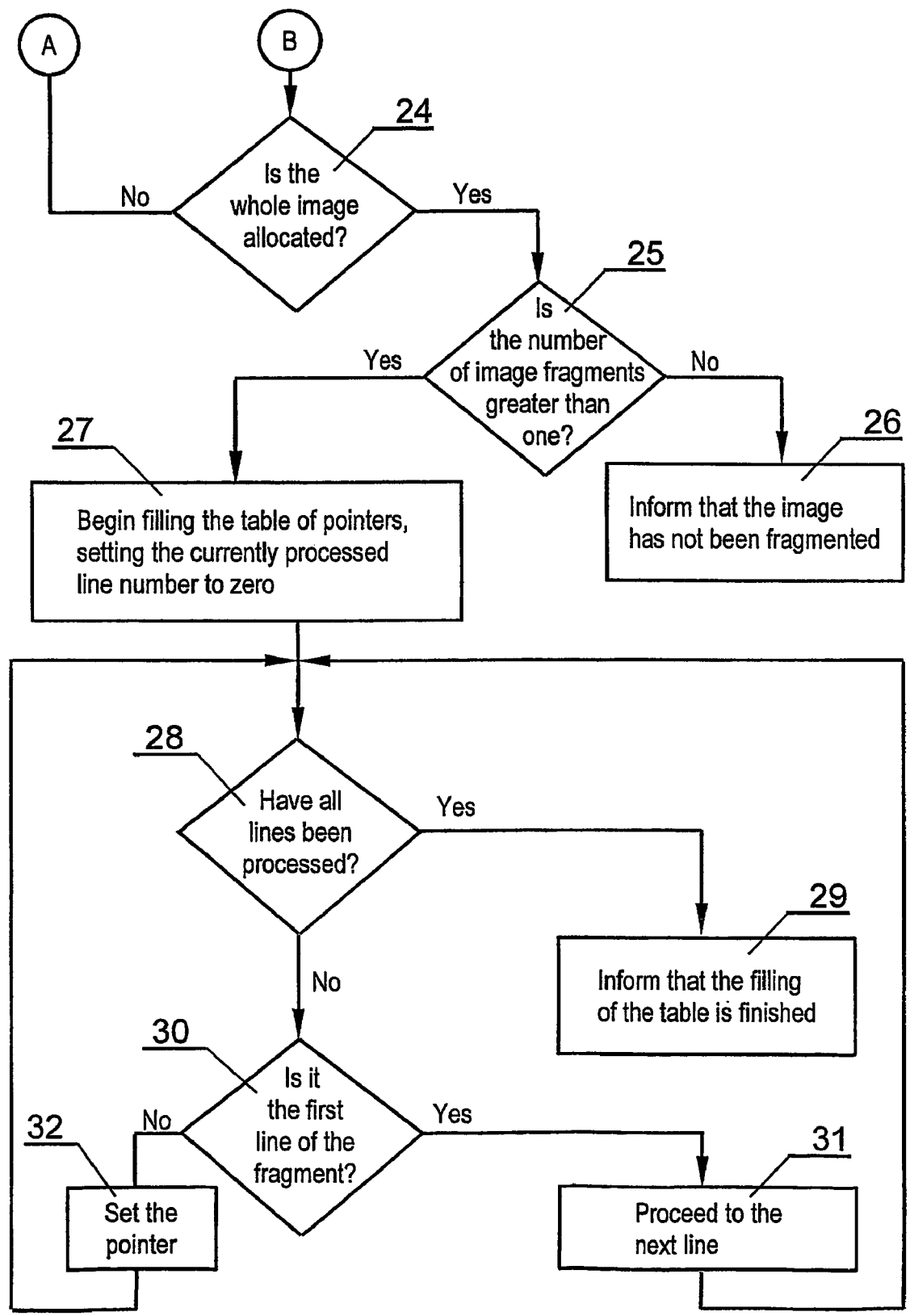

FIGS. 4A and 4B present a flow diagram of the algorithm used to store data. It is divided in points labeled "A" and "B". Parameters of the image for which a table of pointers is to be created are read in step 15. The parameters include: a pointer to the table of pointers to individual lines, a size of an individual line (defined as a number of bytes) and the number of lines that constitute the whole image. In step 16, an attempt is made to allocate in the memory the whole image or a part of the image defined by the number of the currently processed line and the amount of lines to be allocated. In the first run of the algorithm this will refer to the whole image, because the number of currently processed line defines the first line and the number of lines for allocation is equal to the number of lines of the whole image. If the whole image cannot be allocated, in this step the algorithm will try to allocate a fragment of the image. In step 17 it is checked if the allocation of the given image fragment was successful. In case the allocation was unsuccessful, the number of lines to be allocated is decreased in step 18. This decrease can be accomplished by dividing the number of lines, for which the last attempt of allocation was unsuccessful, by a predetermined number (for example, by 2), or by subtracting a predetermined number of lines, or a number proportional to the number of lines to be allocated. The proportionality factor for decreasing the number of lines is taken from the interval from one to zero. After the number of lines for allocation has been decreased, it is checked, in step 19, if the number of lines for allocation equals zero. If it equals zero, which indicates that the last trial of allocation concerned one line, in step 20 a message is output that the allocation was unsuccessful. If it turns out that the number of lines for allocation is greater than zero, in step 21 an attempt is performed to allocate the given image fragment, defined by the number of currently processed line and the number of lines for allocation. Next, in step 22, it is checked if the allocation of the given image fragment was successful. If the allocation was unsuccessful, it indicates that the fragment for allocation was too large and the procedure returns to step 18, where the number of image lines for allocation is further decreased. After a successful allocation of the image fragment, in step 23 the remaining part of the image for allocation is analyzed. The number of image lines remaining for allocation is calculated and set as the variable defining the number of lines for allocation. The number of currently processed line is set to the number of the first line which has not been allocated, and the number of fragments into which the image has been divided is increased by one. Next, in step 24, it is checked if the whole image has been allocated in the memory. This is performed by comparing the number of the currently processed line and the number of lines into which the image has been divided. If the number of the currently processed line is smaller, the procedure returns to step 16 to perform further image fragmentation. If it turns out that the whole image has been allocated, in step 25 it is checked into how many fragments the image has been divided. More precisely, it is checked, in step 25, if the number of fragments is greater than one. If the image has not been fragmented, in step 26 a message is output, that the entire image data has been stored in one memory fragment. If the image has been stored in several fragments, a procedure of filling a table of pointers to individual lines of the image begins in step 27. The number of line, to which a pointer is assigned, is set to zero. In step 28 it is checked if all the lines have been processed. If so, a message is output in step 29 that filling the table of pointers has been finished and the algorithm is complete. The table of pointers to individual lines contains addresses of individual lines of the image. If not all the lines have been processed yet, it is checked, in step 30, if the currently processed line is the first line of the image fragment. More precisely, it is checked if in the table of pointers to individual lines of the image there is set a non-zero value for the currently processed line. If so, this indicates that this line constitutes the beginning of an image fragment. In step 31 the number of the first line of the current fragment is set to the number of the currently processed line. Next, the number of the currently processed line is increased by one and the procedure returns to step 28. If it is not the first line of a fragment, the address of the currently processed line is stored in the table of pointers to individual lines in step 32. The address is determined by the address of the first line of the current fragment and the distance of the currently processed line from the first line of the fragment. Next, the number of the currently processed line is increased by one and the procedure returns to step 28.

Figure 5A:
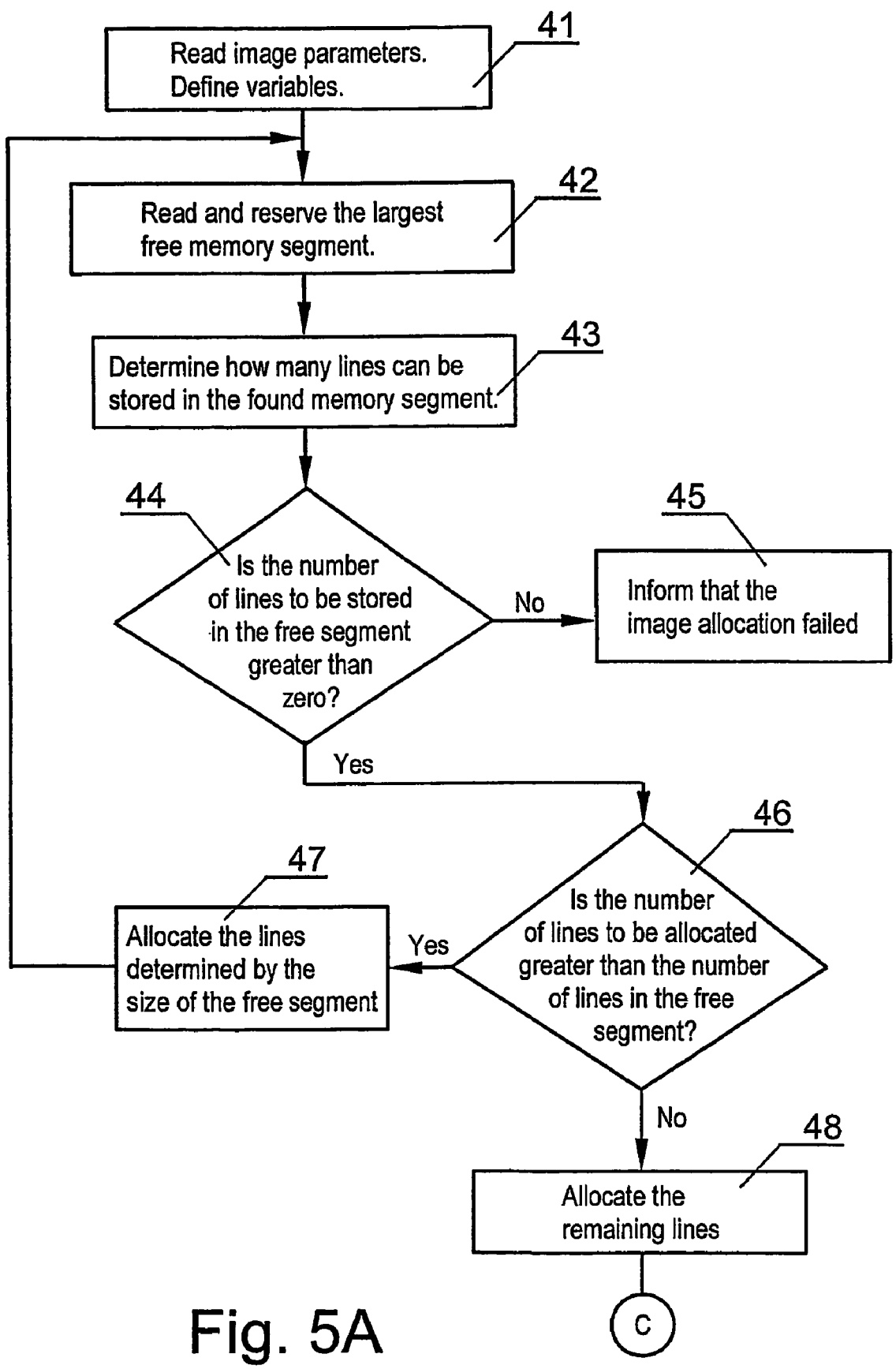
FIGS. 5A and 5B illustrate flow diagrams of another algorithm used for storing, images divided into lines, in the memory.
Figure 5B:
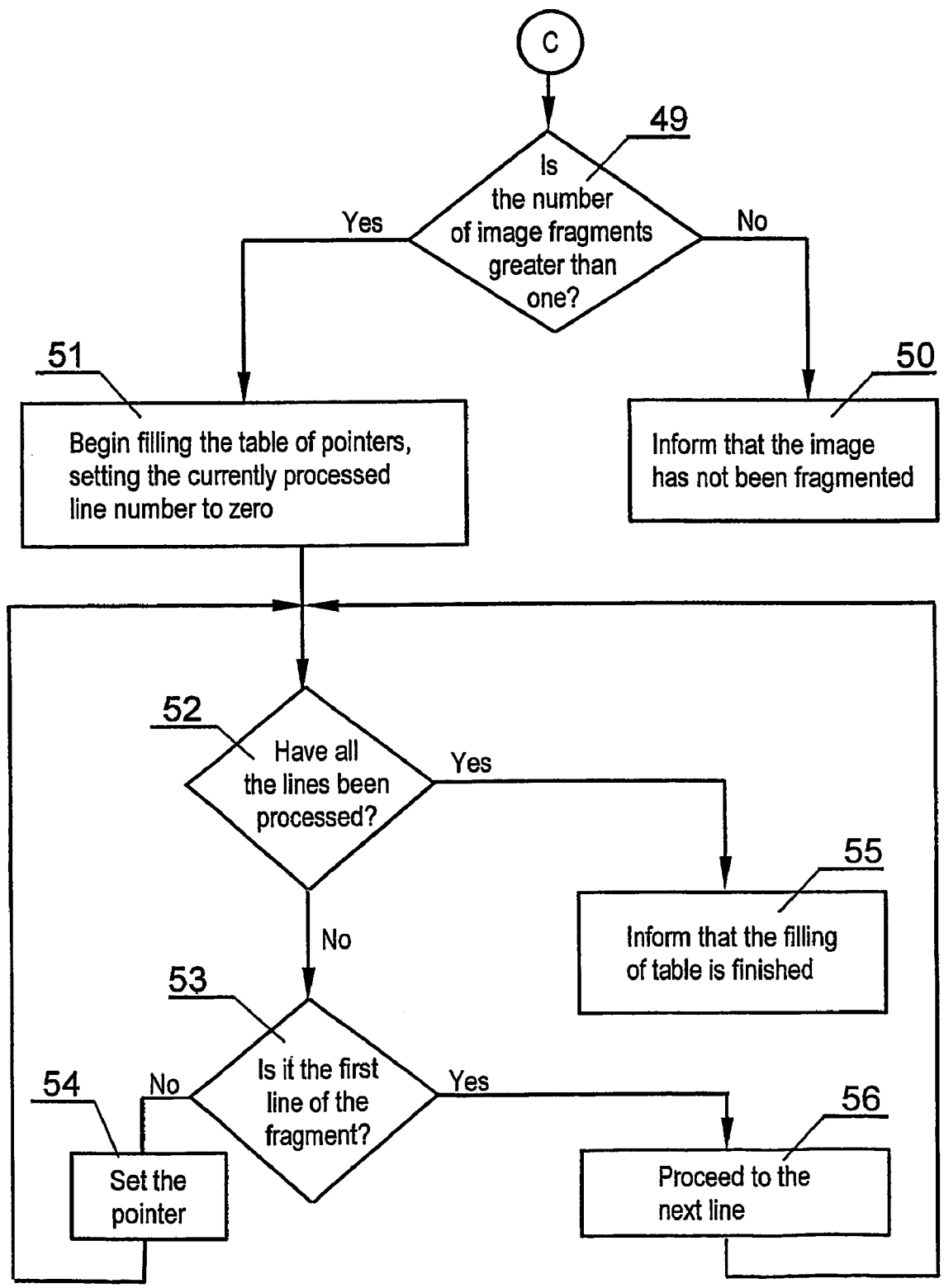

FIGS. 5A and 5B present a flow diagram of another algorithm for storing data. The flow diagram is divided in point labeled "C". Similarly to the algorithm shown in FIG. 4A, in the first step 41 the parameters of the image are read, for which the table of pointers is to be created. The largest available segment of memory is found and reserved in step 42. Next, in step 43, the number of lines that could fit in that free segment is calculated. In step 44 it is checked if the number of lines that could fit in the free memory segment is greater than zero. If the free segment is too small even for a single line, a message is output in step 45 that the allocation of the image was unsuccessful. Otherwise, in step 46 it is checked if the number of lines for allocation is greater than the number of lines that could fit in the free memory segment. If all the lines left for allocation can fit in the free memory segment, they are allocated in step 48. Otherwise, in step 47, only the amount of lines that can fit in the free memory segment is allocated. The allocation of the remaining part of the image is continued, starting from step 42.

The remaining part of the algorithm is similar to algorithm from FIG. 4B, where step 49 is equivalent to step 25. In step 50 a message is output, informing that the image data has been stored in its entirety in a single memory segment. If the image has been stored in several fragments, step 51 initiates a procedure of filling a table of pointers to individual lines of the image. The number of the currently processed line is set to zero. In step 52 it is checked if all the lines have been processed. If so, a message is output in step 55 that filing the table of pointers has been completed. If not all the lines have been processed yet, it is checked, in step 53, if the currently processed line is the first line of the image fragment. If so, in step 56 the number of the first line of the current fragment is set to the number of the currently processed line. Next, the number of the currently processed line is increased by one and the procedure returns to step 52. In case it is not the first line of the fragment, in step 54 the address of the currently processed line is written to the table of pointers to individual lines. Next, the number of the currently processed line is increased by one and the procedure returns to step 52.

Figure 6:
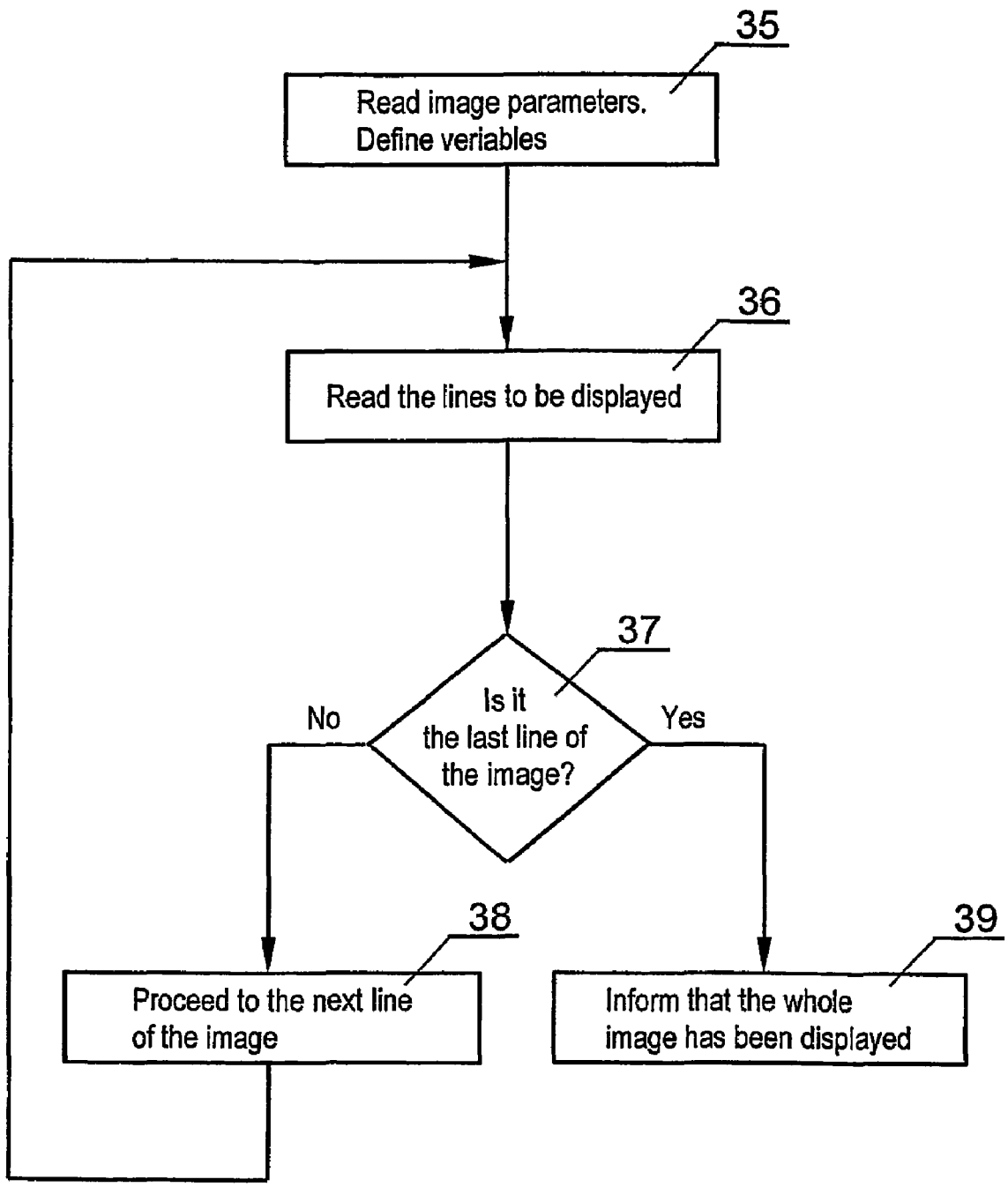
FIG. 6 illustrates a flow diagram of an algorithm used for reading data describing an image.

The algorithm for reading the image from the memory is presented as a flowchart in FIG. 6. It starts from step 35 in which the parameters of the image to be displayed are read. These parameters include a pointer to the table of pointers to individual image lines, a size (a number of bytes) of one image line and a number of lines into which the image has been divided. In this step there is also defined a variable indicating the number of the currently processed line. The currently processed line, after having been read, is displayed in step 36. The image fragment defined by that line is read from the memory address defined by the table of pointers to individual image lines for a currently processed line. Starting from that address, a specific number of bytes are read, depending on the size of one line of the image. In step 37 it is checked if the number of the currently processed line is smaller than the number of lines into which the image has been divided. If so, this suggests that not all of the lines have been displayed yet. Therefore, in step 38 the number of currently processed line is increased by one and the procedure returns to step 36. After the last line has been displayed, a message is output in step 39 that the whole image has been displayed.

The algorithms described here can be implemented in any programming environment that provides image display functionality. In order to employ them, the existing functions need to be re-defined or modified in such a way that, while performing graphical operations, they always refer to the memory through the table of pointers to image lines. This holds for functions displaying individual image fragments, as well as functions displaying full-screen images.

It will be understood that each of the elements described above, or two or more together, may also find a useful application in other types of methods for allocation of data differing from the types described above.

While the invention has been illustrated and described as embodied in the context of a method for allocation of data for images in operating memory, it is not intended to be limited to the details shown, since various modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A method for memory allocation for images, comprising the steps of:
   while storing the data describing an image in operating memory dividing the image into lines, each line being described by a separate subset of data;
   allocating the image in the operating memory by
      determining a size of a largest free block of operating memory,
      creating a set of data from subsets of data which have not been allocated in operating memory yet, the set of data comprising a maximum number of subsets of data that can be allocated in the largest free block of operating memory;
   allocating the set of data in the largest free block of operating memory until data describing the image is allocated in operating memory; and
   while reading the image, reading consecutive lines from the operating memory until the whole image is read.

2. The method according to claim 1, wherein each set of data contains subsets of data describing an integer multiple of lines.

3. The method according to claim 1, wherein each line is assigned a number.

4. The method according to claim 1, wherein simultaneously with allocating the subsets of data in operating memory, the table of pointers to individual lines is filled.

5. The method according to claim 4, wherein the table of pointers to individual lines comprises the memory address of each line of the image.

* * * * *